United States Patent
Varghese et al.

(10) Patent No.: US 10,339,483 B2
(45) Date of Patent: Jul. 2, 2019

(54) ATTRITION RISK ANALYZER SYSTEM AND METHOD

(71) Applicant: Tata Consultancy Services Limited, Mumbai (IN)

(72) Inventors: Thoppil Antony Varghese, Chennai (IN); Sriram Joshi, Chennai (IN); Shrilekha Sampathkumaran, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 427 days.

(21) Appl. No.: 15/062,882

(22) Filed: Mar. 7, 2016

(65) Prior Publication Data

US 2016/0314418 A1    Oct. 27, 2016

(30) Foreign Application Priority Data

Apr. 24, 2015   (IN) .......................... 1668/MUM/2015

(51) Int. Cl.
*G06Q 10/00*    (2012.01)
*G06Q 10/06*    (2012.01)
*G06Q 10/10*    (2012.01)

(52) U.S. Cl.
CPC ..... *G06Q 10/0635* (2013.01); *G06Q 10/1053* (2013.01)

(58) Field of Classification Search
CPC .......................................... G06Q 10/00–50/00
USPC .............................................. 705/7.11–7.42
See application file for complete search history.

(56) References Cited

U.S. PATENT DOCUMENTS

| | | | | |
|---|---|---|---|---|
| 8,073,786 B2* | 12/2011 | Solari | .................... | G06Q 10/10 705/1.1 |
| 8,370,193 B2* | 2/2013 | Saraf | .................. | G06Q 10/0635 705/7.36 |
| 2008/0065633 A1* | 3/2008 | Luo | ..................... | G06F 16/9535 |
| 2009/0012850 A1* | 1/2009 | Stretch | ........... | G06Q 10/063112 705/7.14 |
| 2009/0307025 A1* | 12/2009 | Menon | ................... | G06Q 10/06 705/7.28 |
| 2011/0145161 A1* | 6/2011 | Scarborough | ........ | G06Q 10/063 705/321 |

(Continued)

FOREIGN PATENT DOCUMENTS

WO    WO 01/55939 A2    8/2001

OTHER PUBLICATIONS

Gray et al., "Title of the article: Reducing Employee Turnover with Predictive HRMS Software", Jobscience, http://www.jobscience.com/blog/reducing-employee-turnover-predictive-hrms-software/, pp. 1-10, (2013).

(Continued)

*Primary Examiner* — Alan S Miller (74) *Attorney, Agent, or Firm* — Finnegan, Henderson, Farabow, Garrett & Dunner LLP (57) ABSTRACT

The present disclosure envisages a computer implemented system and method for identifying employees who are likely to attrite from an organization with plurality of outputs interrelated to this likelihood, significantly being their cumulative weighted trigger score and their cumulative risk flag. This increases the overall usability and accuracy of the prediction and assessment of the attrition risk analyzer system.

15 Claims, 3 Drawing Sheets

(56) References Cited

U.S. PATENT DOCUMENTS

| | | | |
|---|---|---|---|
| 2011/0307303 A1* | 12/2011 | Dutta | G06Q 10/00 705/7.42 |
| 2013/0151557 A1* | 6/2013 | Shanken | G06F 16/2455 707/769 |
| 2013/0166358 A1* | 6/2013 | Parmar | G06Q 10/06393 705/7.39 |
| 2013/0290195 A1* | 10/2013 | Frazier | G06Q 30/0278 705/306 |
| 2014/0067461 A1 | 3/2014 | Zhang et al. | |
| 2014/0172514 A1* | 6/2014 | Schumann | G06Q 10/06393 705/7.39 |
| 2014/0180756 A1* | 6/2014 | Hankin | G06Q 10/0635 705/7.28 |
| 2014/0244362 A1* | 8/2014 | Chaudhury | G06Q 10/06375 705/7.37 |
| 2016/0196511 A1* | 7/2016 | Anisingaraju | G06Q 10/063 705/7.11 |

OTHER PUBLICATIONS

"Using Workforce Analytics to Predict Employee Turnover", Deloitte CIO Journal, Publisher: Deloitte CIO Journal, Wall Street Journal, Dow Jones & Company, http://deloitte.wsj.com/cio/2012/10/31/using-workforce-analytics-to-predict-employee-turnover/# 2 pages, (2012).

Alao D. et al., "Analyzing Employee Attrition Using Decision Tree Algorithms", Computing, Information Systems & Development Informatics, vol. 4, No. 1, pp. 17-28, (2013), Pub., Creative Research & Evaluation Group, http://www.cisdijournal.net/uploads/V4N1P3-CISDI_-Alao_and_Adeyemo_-_ANALYZING_EMPLOYEE_ATTRITION_USING_Decision_Tree_Algorithm.pdf.

Palshikar et al., "Arrest Attrition with Analytics", White Paper, Tata Consultancy Services, http://www.tcs.com/SiteCollectionDocuments/White%20Papers/Innovation_Whitepaper_Arrest_Attrition_Analytics_12_2011.pdf, pp. 1-15 (2011).

* cited by examiner

ATTRITION RISK ANALYZER SYSTEM AND METHOD

PRIORITY CLAIM

This U.S. patent application claims priority under 35 U.S.C. § 119 from Indian Patent Application No. 1668/MUM/2015, filed on Apr. 24, 2015, the entirety of which is hereby incorporated by reference.

TECHNICAL FIELD

The present invention relates to attrition risk prediction and assessment, and more particularly, to employee attrition risk prediction and assessment using cumulative weighted trigger score and cumulative risk flag as two interlinked and distinct outputs.

BACKGROUND

In the business world, it is difficult to replace attriting associates with resources from other segment of resource pool. This is due to specific nature of services being offered; for example an IT industry may typically involve data centers, storage, security, networking and other infrastructure support when compared to application or development support that may be more specific to another service industry. In a given situation, due to increasingly specialized customer requirements, the highly talented individuals (or for that matter any experienced professionals) who attrite can only be replaced by external hiring or by specialized cross training. External hiring involves an average of 85 days of replacement time, not to mention the hiring and induction/shadow costs for replacements. Thus retention is of paramount importance to any organization, and hence critical need for an attrition risk analysis system is highlighted.

Voluntary employee attrition in an enterprise for any reason whatsoever, affects project delivery schedules and business operations continuity. Proactively identifying which employees are likely to voluntarily attrite at any given point in time helps HR personnel to quickly and proactively estimate what retention strategies could be adopted to retain these employees successfully. It also aids in timely replacement planning.

Conventional attrition prediction models use machine learning methods with numerous attrition triggers as input datasets. These inputs are then internally multiplied with weights that are self-adjusted via error backpropagation by the machine learning model, and the likelihood of attrition is predicted as the classified output. This training is done via initially supervised learning methods. Employees are then discretely categorized on the basis of their probability to attrite, derived from discrete thresholds on the output that is the cumulative sum of the weighted inputs and in some cases normalized via an activation function i.e, the employees are scored cumulatively on multiple risk parameters and a cut off value is applied on the cumulative score to predict the employee's attrition risk. This type of cumulative summing and thresholds does not help distinguish who are the most likely and the least likely risks category.

SUMMARY

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

Accordingly, in a preferred embodiment the disclosure provides a method for predicting and assessing employee attrition risk using at least one programmed processor. In one aspect, at least one repository is maintained that includes data set categorizing plurality of predetermined attrition triggering parameters. The quantitative information indexed for at least one attrition triggering parameter of the employee is retrieved from the data set. Now, a weighted trigger score is computed for each retrieved quantitative information based at least in part on numeric value colligated with employee-organization association information and at least in part on a weight percentage accorded to said quantitative information. The risk flag is then assigned to corresponding quantitative information. Next, numeric value colligated with employee-organization association information and at least in part on a weight percentage is accorded to said quantitative information, and a corresponding risk flag is assigned thereto. Finally, based at least on the calculated cumulative weighted trigger score and the cumulative risk flag, the likelihood of employee attrition is predicted.

According to another embodiment of the disclosure, a system for predicting likelihood of employee attrition is presented. The system comprises at least one processor, at least one repository containing a data set categorizing plurality of predetermined attrition triggering parameters; a communication interface coupled to the system processor, capable of connecting the system processor to the repository and a plurality of input units and display units; and a memory coupled to the system processor, the memory storing a portal logic executable by the processor causes the system to perform the following steps: retrieving from the data set, quantitative information indexed for at least one attrition triggering parameter of the employee; computing a weighted trigger score for each retrieved quantitative information that is based at least in part on numeric value colligated with employee-organization association information and at least in part on a weight percentage accorded to said quantitative information, and assigning a corresponding risk flag thereto; calculating a cumulative weighted trigger score by aggregating each weighted trigger score and assigning a cumulative flag to the corresponding quantitative information, said cumulative flag deduced from each of a priori assigned risk flags; and outputting on any of a plurality of display units, based on calculated cumulative weighted trigger score in combination with the cumulative risk flag, a prediction on likelihood of employee attrition.

In one significant embodiment of the present disclosure, the attrition triggering parameters are of type "star attrition triggers" or "non-star attrition triggers that further comprise a non-exhaustive set of satisfaction and dissatisfaction factors including but not limited to current and prior annual rating combinations, employee rating disagreements, promotion status, salary variations, grievances and redressal, project allocation history, skill set, working hours, shift timings, commuting distance and time of travel, location, reward and compensation, recognition history, growth curve, previous employment history, learning initiative levels, transfer request, academic history, roles and responsibilities, designation or alignment with organization objectives.

BRIEF DESCRIPTION OF THE DRAWINGS

The foregoing summary, as well as the following detailed description of preferred embodiments, are better understood when read in conjunction with the appended drawings. For the purpose of illustrating the invention, there is shown in the drawings exemplary constructions of the invention; however, the invention is not limited to the specific methods and system disclosed. In the drawings.

DETAILED DESCRIPTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred systems and methods are now described.

The disclosed embodiments are merely exemplary of the invention, which may be embodied in various forms.

The elements illustrated in the Figures interoperate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition risk analyzer system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and nonvolatile memory and/or storage elements), plurality of input units, and plurality of output devices. Program code may be applied to input entered using any of the plurality of input units to perform the functions described and to generate an output displayed upon any of the plurality of output devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk.

Any data disclosed herein may be implemented, for example, in one or more data structures tangibly stored on a non-transitory computer-readable medium. Embodiments of the invention may store such data in such data structure(s) and read such data from such data structure(s).

In accordance with the present invention, the primary objective is to provide a system and method for predicting and assessing risk of employee attrition.

Another objective of the invention is to provide a method and system enabling objective identification of employees who are likely to voluntarily attrite from the organization at any given point of time.

Another objective of the invention is to provide a method and system for proactive identification of employee attrition plans with two interlinked outputs, namely the risk flag and the weighted trigger score for his/her timely replacement.

Yet another objective of the invention is to provide a method and system for identification of likelihood and possible reasons as to why the employee is attriting.

A further object of this disclosure is to pre-emptively adopt retention strategies for the voluntary attrition cases within an organization.

Yet another object of this disclosure is to enable generation of business cycle relevant attrition predictions.

Another object of this disclosure is to improve the classification of attrites within each category (as most likely, likely and least or not likely to attrite) by using cumulative weighted trigger scores and cumulative risk flags as two different outputs, so that identification of attrites within each flag category becomes more pertinent.

Still another object of this disclosure is to aid Human Resources (HR) personnel adopt best practices through continuous assessment of workforce in the organization.

Another object of this disclosure is to provide a methodology to decrease overall churn rate, cut cost to the company and increase profitability of the organization.

Other objects and advantages of the present invention will be more apparent from the following description when read in conjunction with the accompanying figures, which are not intended to limit the scope of the present disclosure.

Definitions:

"Repository" is a computer system that stores and manages access to "resources", Specifically, a repository is a combination of integrated software components and an allocation of computational resources, such as memory, disk storage, a computer, and processes on the node for executing the integrated software components on a processor, the combination of the software and computational resources being dedicated to managing storage and access to resources.

"Attrition", used hereinafter refers to the reduction in an organization's work force caused arbitrarily through voluntarily tendered resignations of a portion of the workforce personnel, for any reasons whatsoever.

"Attrite", used hereinafter refers to those personnel from the organizations that have voluntarily tendered their resignations, or who have voluntarily terminated their employment with the organization for any reason whatsoever.

"Churn rate" for any specific timeframe, used hereinafter refers to the rate at which employees voluntarily resign from the organization during that specific timeframe.

"Machine Learning" used hereinafter refers to the subfield of computer science which deals with the developing and testing of methodologies which are dependent entirely upon the inputs (data) and use these inputs to derive their own output classifications/predictions, without any explicitly programmed instructions on how to draw these outputs.

"Neural Network" or "Artificial Neural Network" (ANN) used hereinafter refers to system models that "learn" from data, specifically by, operating upon a system of interconnected "neurons" which compute values from inputs. These models learn from the pattern of inputs presented to them in training sets, and then compute the outputs for test sets accordingly.

"Multi-layer Perceptron Network" (MLP) used hereinafter refers to a type of feed-forward artificial neural network model that maps input datasets onto a set of corresponding outputs which are generally non-linearly classifiable. The general structure of an MIT in this context is taken to be comprising of an input layer with an arbitrary number 'i' of input nodes, a hidden layer comprising of an arbitrary number 'j' of hidden nodes, and an output layer comprising of an arbitrary number 'k' of output nodes.

"Supervised Learning" used hereinafter refers to any machine learning models where training sets of inputs and the desired outputs are provided to the model, so that the model then processes the inputs and "learns" to adjust the outputs on its own—by comparing against the desired outputs and in turn propagating errors back through the system, leading to auto-adjustment of the weights until the classification is as desired.

"Backpropagation" or "Error Backpropagation" used hereinafter refers to a type of algorithm where the input data is repeatedly presented to a neural network model, wherein with each presentation the model compares the calculated output with the desired output and computes an error that it feeds back to the neural network's input layers so that the weights are adjusted and the error decreases with each iteration, in turn leading the neural network closer and closer to generation of the desired output. More specifically, this algorithm works in two passes: one being the forward pass where the Neural Network is "activated", layer by layer, and the second being the backward pass: where the error gradient passes backwards from the output layer to the hidden layer and then from the hidden layer to the input layer, thus acting as the basis on which weights are updated in the neural network model.

"Activated" or "activation" in the context of a neural network model, used hereinafter refers to how an output node in a neural network model gains a computed value dependent on a mathematical function.

"Empirical analysis" used hereinafter refers to a form of modelling and analysis approach based on numerous data parameters and the statistical correlations between them.

The present disclosure relates to the field of employee attrition risk prediction and assessment in any modern labor intensive organization. The disclosure pertains to use of statistical parametric model to demonstrate how risk flagging and scoring are done in disparate ways to aid in honing in on most-likely-to-attrite-risk cases indicative of early voluntary attrition that enhances the overall usability of the attrition prediction and assessment model used herein.

The technical advancement of the present disclosure in relation to previously existing attrition prediction models is in using both weighted trigger scores and risk flags simultaneously, but as two different yet interlinked outputs, so that more information is gleaned about attrites within each specific attrition category, identified as most likely, likely and least/not likely to attrite.

Figure 1:
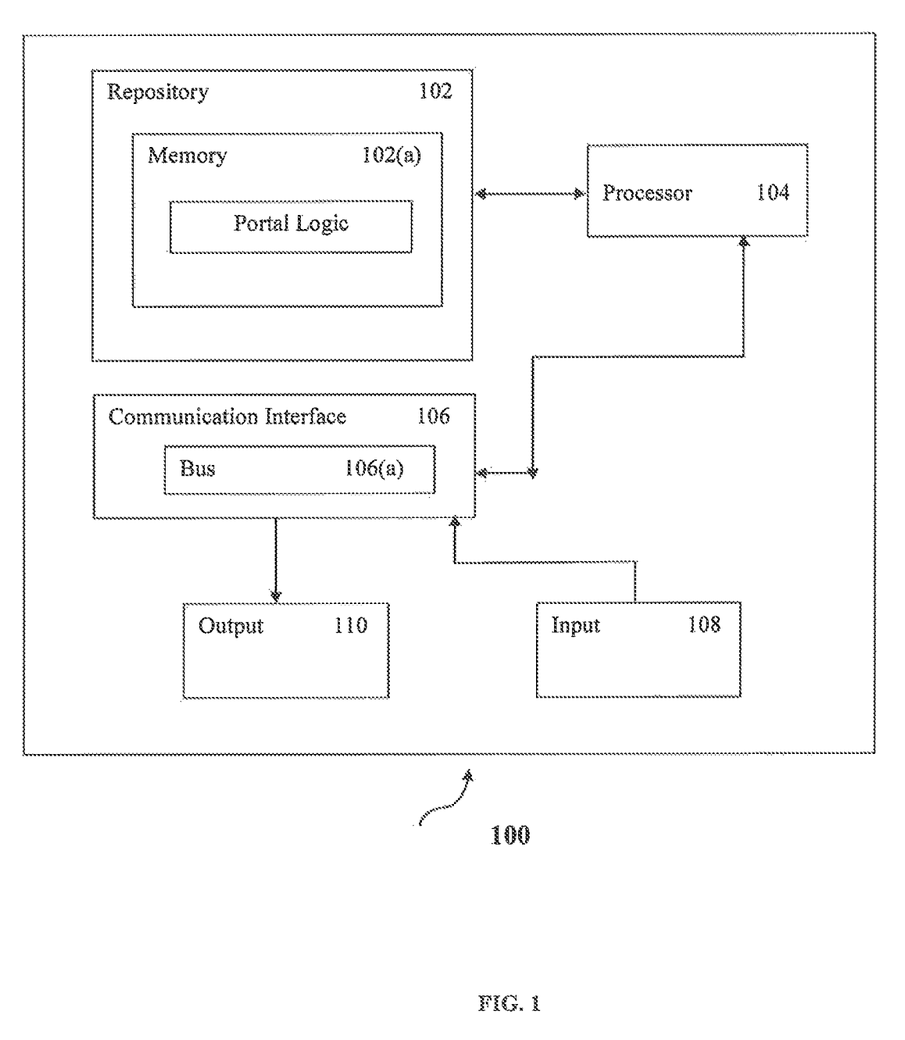
FIG. 1 is a schematic functional block diagram of an exemplary architecture for the attrition risk analyzer system of the present disclosure.

FIG. 1 shows one example of an attrition system 100 that includes a repository 102 hosting a memory 102(a), a processor 104, and a communication interface 106. The communication interface 106 includes a bus 106(a) for communicating information, and remains connected with the processor 104 for enabling processing of information. The communication interface 106 further connects the processor 104 to plurality of other input units $108_a \ldots 108_n$ and output units $110_a \ldots 110_n$. While the input units $108_a \ldots 108_n$ include alphanumeric and other keys, is coupled to bus 106(a) for communicating information and command selections to processor 104, Another type of user input units $108_a \ldots 108_n$ may include a cursor control, such as a mouse, a trackball, or cursor direction keys for communicating direction information and command selections to processor 104 and for controlling cursor movement on display units $110_a \ldots 110_n$.

The memory 102(a) stores a portal logic that is executed by the processor 104 and is capable of generating reports that enables the HR officer to predict and assess early voluntary attrition of any employee.

Broadly, and in accordance with one general embodiment, the method for predicting and assessing employee attrition risk involves maintaining a repository 102 storing/hosting a data set that contains plurality of attrition triggering parameters categorized as "star attrition triggers" or "non-star attrition triggers". In one given embodiment the data set comprises an annotation in a plurality of tables that is indicative of employee attributes pertaining to attrition triggering parameters along with the associated quantitative information with each employee being uniquely associated with a primary key.

The star and non-star attrition trigger parameters comprise a non-exhaustive set of satisfaction (positive) and dissatisfaction (negative) factors including but not limited to current and prior annual rating combinations, employee rating disagreements, promotion status, salary variations, grievances and redressal, project allocation history, skill set, working hours, shift timings, commuting distance and time of travel, location, reward and compensation, recognition history, growth curve, previous employment history, learning initiative levels, transfer request, academic history, roles and responsibilities, designation or alignment with organization objectives.

In one non-limiting illustration, the set of star attrition trigger parameters may include factors like:

project aging—for example, when an employee has been involved with a project for several years, and while is still in certain junior grade, then the proposed system shall categorize this situation as one of the signifiers for most likely risk of attrition, especially when the employee is niche-skilled. In a parametric embodiment of our system and method, a high weightage is associated with this trigger's value and added cumulatively to the weighted trigger score output, and a most likely or likely risk flag is assigned to the flag output depending on the employee's grade/seniority in the organization.

onsite opportunity for the employee—when in tandem with a specific experience and skill, Located Offshore—again dependent upon the employee's experience and skill and marital status, Unallocated High-Performer trigger—especially pertaining to employees in specific grades and having niche skills, rewards and recognition recipient, Monetary (Appraisal or Compensation or Finance), Transfer request which either remain unresolved or are rejected, or Rewards Grievances also fall into most likely of attrition categories, and hence this are also accounted for as star triggers promotion status (if eligible not initiated, pending for several months, or out rightly rejected), annual performance ratings when compared with the ratings that the employee obtained in the previous years, niche in area of specialization, salary hikes or dips, salary appraisal (if not made at prevalent market rates), shift timings (night shifts or frequent shift change or extended working hours), no consideration of relocation to hometown, learning exposure, training levels, showing initiative in signing up for and completing learning courses very proactively, employee having an active CV in external job sites being dissatisfied with the current role in the organization, commute distance or commute time being beyond a certain adverse threshold, the pickup point if company provided transport being either home pickup or a point-pickup, the type of process (data or voice) if in support projects, previous organization reputation (if having worked in a tier 1 organization previously) etc. This list however, shall not be construed as limiting and can be a non-exhaustive set.

Similarly, the non-star attrition factors considered for present invention, though not limiting, may include the academic background of employee, holding a degree from a reputed college, obtaining high rankings year after year, less amount of aging in the same project etc.

For each of the data set, a quantitative information is indexed in the repository 102 corresponding to each of the attrition triggering parameters. The data storage repository 102 contains the entire data set representative of quantitative information in the form of numerous data tables with multiple columns in each. The rows of the data tables are indexed by means of unique Employee IDs for all the employees in the organization, serving as both primary key and foreign key. The quantitative information contained in these data tables enables computation of values indicative of weighted trigger scores for both star and non-star attrition trigger parameters.

As indicated previously, the data tables with multiple rows and columns contains a base list of all the employees within the organization or business unit or project for whom the attrition risk predictions are to be made. A non-exhaustive but necessary set of basic data is captured for them—details such as Employee ID, Employee Name, Current Grade, Joining Grade, Date of Joining, Tenure in organization, Prior Experience, Prior Organization rating, Degree Studied, Institute Degree is From, Skillset, Current Address, Hometown, Base Country, Work Country, Age, Gender, Marital Status, Designation, Current Assignment Status in the Organization, Employee Type (Full Time Employee/Business Associate).

Following from above, a weighted trigger score is then computed by the system processor 104 for each retrieved quantitative information and a corresponding risk flag is assigned to corresponding attrition triggering parameter. The weighted trigger score is based at least on the numeric, value bearing an association with employee organizational history. This may include, though not limited to employee employment history, employee grade and designation, employee performance history or any combination thereof.

The weighted trigger score, may further be based upon the weight percentage that is accorded to the quantitative information. In one submitted embodiment, the weight percentage may be accorded a predetermined or system computed default value. Alternately, the model offers flexibility to the end user to re-set the weights assigned to attrition triggering parameters thereby enabling overriding of predetermined default values assigned to several of the weight percentages to further enable business cycle relevant attrition predictions.

Figure 2:
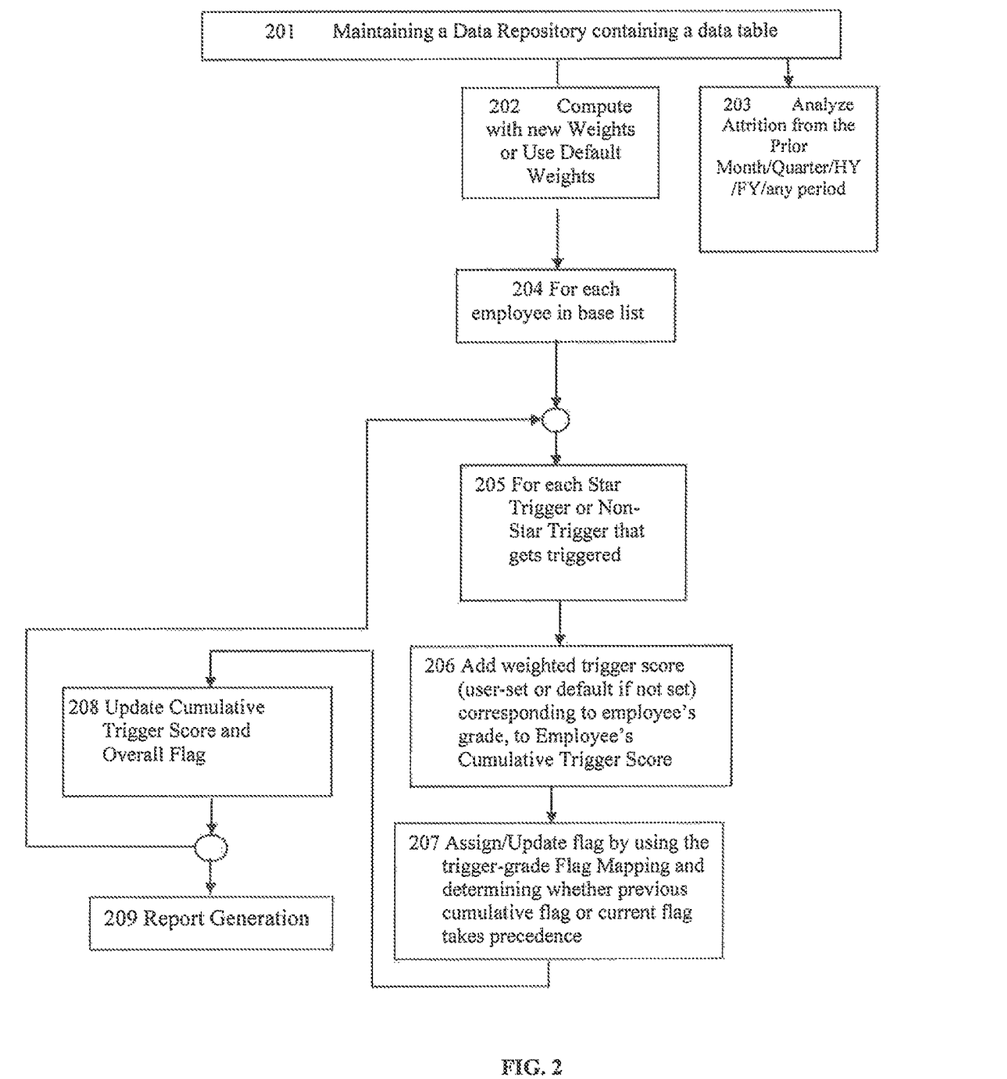
FIG. 2 illustrates a flowchart of a parametric model to recognize potential attrites, via use of both weighted trigger scores and risk flags as two different outputs, in accordance with one embodiment of present disclosure.

Now, referring to FIG. 2, a flowchart illustrating a parametric model of present disclosure to identify potential attrites via use of both weighted trigger scores and risk flags as two different outputs is presented. As shown in step 201 a data table is maintained in the data storage repository 102 and serves as an input for computation of weighted trigger score for each quantitative information. In accordance with one preferred embodiment, and as also discussed earlier, the system 100, in step 203 presents before the user a list of default weights for each of the triggers across each grade (where grade is derived at from organizational and prior organizational experience), thus provisioning for resetting/voiding of any of the weights if immaterial, and then proceeding to step 204 to begin looping through steps 205 to 208 for each of the employees present in the Employee Base-list table in data set for whom attrition risk predictions are to be made. In step 205, using the unique employee ID, to index into each of the data tables to access all the records pertaining to the employee, a numeric value associated with each corresponding star and non-star trigger is derived depending on the presence or absence of a record for the employee in the corresponding data table, and also on whether that parameter has been triggered. This "triggering" of any star or non-star parameter is dependent on the values present in the columns pertaining to the employee's records pertinent to that trigger. The weighted trigger score is obtained by multiplying the triggered numeric value colligated with employee organization association information with the weight percentage that corresponds to the specific trigger or default value which is assigned as per the employee's Current Grade or other employee organizational information or a user re-set value, as in step 206, This weighted trigger score generated for each star or non-star trigger that pertains to an employee, is added to the value of the cumulative weighted trigger score 208. When computation of the weighted score for all the triggers has been performed, the cumulative weighted trigger score then holds the final weighted sum of all the individual trigger scores for that employee. This cumulative trigger score value is then written to a column designed for storing the Cumulative Trigger Score, either in the Employee Base-list data table and the row being indexed by the unique employee ID for reading and writing purposes, or to a separately created risk data table that may include a non-limiting set of columns such as the Employee ID, Cumulative Weighted Trigger Score, Cumulative Risk Flag, HR Remarks, Predicted Risk, etc.

As depicted in FIG. 2, the Cumulative Weighted Trigger Score and Cumulative Risk Flag are written to columns in the Employee Base-list table in the row as indexed by the unique employee ID. Step 207 in FIG. 2 deals with generation of the overall cumulative risk flag with the flagging rules set as already described above.

For every star or non-star trigger that is present for an employee, the flag for the trigger and as corresponding to the Current Grade, is derived from a lookup table, and the cumulative flag for the employee is determined based on considering all the flags that have been set for that employee ID, and setting it to the highest found—with Red having the highest precedence, Amber the next and Green the lowest.

In step 203, regression analysis of past attrites is used that considers the specific timeframe of attrition and scores or flags they have triggered to generate a report. The report can be generated using one of any among the following non-exhaustive set of parameters such as Organizational and Prior Tenure, Performance Parameters, Gender, Customer Name or ID, HR Officer Name or ID, Project Name or ID, Supervisor Name or ID etc.

In one exemplary and non-limiting example, the system 100 generates a report on attrition risk warning, as shown in step 209. The system 100 may be integrated with an external Human Resource Management System (HRMS) that notifies the HR officer instantly for employee's cumulative risk flag turning from Green to Red, Green to Amber, or Amber to Red [movement from one level to the next higher risk level in effect] for the officer to take immediate remedial action. The notification can be either via email, alerts in the FIRMS portal, report generation or through any other or combination of those means as well.

In addition to, but not limited to, the notifications, the HR officer would have a list of all the system flagged employees in their accounts, split account-wise (e.g.: by customer name, customer ID, etc.) and as action items in their FIRMS workflows, such that within each account-level split, the HR would be able to drill-down to each Red/Amber/Green employee, connect with them, gauge their attrition intent, adopt retention measures as required, contribute to modification of the parameters after periodic observation, etc.

This can be explained well with an example wherein a promotion data table can be represented to contain separate rows for all employees within the organization, and further contains multiple columns storing information regarding their Last Promotion Date, Current Promotion Status, Current Grade in the organization, Due Date for Promotion, Years till Next Promotion, etc. Indexing into this table for a particular employee ID to determine the value of the Star attrition trigger "Promotion Status" will involve looking at these nonlimiting set of columns and determining the employee's weighted trigger score regarding their promotion status.

In one preferred embodiment, the employee grade or employee tenure in a given organization is imparted due significance while calculating the employee weighted trigger score, which is further added to the employee's cumulative trigger score.

In one given embodiment, for any specific business cycle, the user can nullify all other trigger parameters irrelevant to business cycle or as on need basis, and accordingly the output can be derived regarding which employee can be foreseen to leave the organization based on flag and score. Thus, the present system and methodology envisages the identification of business-cycle relevant attrition, not witnessed in existing solutions.

In one exemplary embodiment, high scores are accorded not only for all positive factors for an employee, but also for negative factors. However, it is assigning of high scores to the positive or satisfaction factors of attrition triggering parameters that enables identification of high-performers within the unit and their attrition risk the moment a negative factor is triggered for them.

Now, a cumulative weighted score is computed by aggregating each weighted trigger score accumulated for each quantitative information of the attrition triggering parameters—all the star and non-star attrition triggers that are triggered for each employee.

In one illustrated embodiment, the risk flag turns red exhibiting probability of highly likely risk of attrition for a quantitative information that is associated with star attrition trigger. Likewise, the risk flag turns amber that shows less likely risk of attrition for a quantitative information corresponding to star or non-star attrition trigger, and green to depict least likely risk of attrition for a quantitative information corresponding to non-star attrition trigger. It is the significance attached with an attrition triggering parameter, as either star or non-star, which enables the system determine what indicator color the risk flag may take from either red, amber or green depending upon the grade and seriousness of the trigger. Thus, any or each of these star triggers when pertinent for an employee as signified by a valid record for the said employee in the corresponding data table could lead to a red or amber or green flag dependent on the grade of the employee within the organization.

Proceeding towards further explanation of cumulative risk flag, the proposed system will turn:
a. overall flag of an employee as red if the employee has a set of green, amber and red flags as the set flags after computation of all the star and non-star triggers
b. overall flag of an employee as amber if the employee has a set of green and amber flags as the set flags after computation of all the star and non-star triggers
c. overall flag of an employee as green if the employee has only a list of green flags set after computation of all the star and non-star triggers.

Referring to the example above, wherein weighted trigger score is computed for a Promotion status of the employee as the star attrition triggering parameter, according a red flag against this quantitative information will be suggestive of most likely or high risk of attrition that may require immediate attention.

Score outputs are cumulative, weighted and added for an employee for both positive and negative factors, however the flag output turns red/amber (adverse) only for a negative factor; this dual aspect of scoring-cum-flagging disparately enables HR to easily keep track of both high performers as well as highly dissatisfied performers within the unit (by their score) and viewing their attrition risk (by their flag).

In one preferred parametric embodiment of given disclosure, the cumulative risk flag is computed for the employee. The cumulative flag is assigned based on each of the priori assigned risk flags that means the risk flag shall turn red cumulatively if all the prior flags accumulated for that employee are only at the lesser levels of amber (likely) or green (least or not likely to attrite). The underlying principle is that the cumulative risk flag draws its assignment from a set of a priori risk flags assigned corresponding to each quantitative information of the employee; with such an assignment being determined based on a predetermined order of precedence wherein red is given the highest priority, followed by amber and then green.

Figure 3:
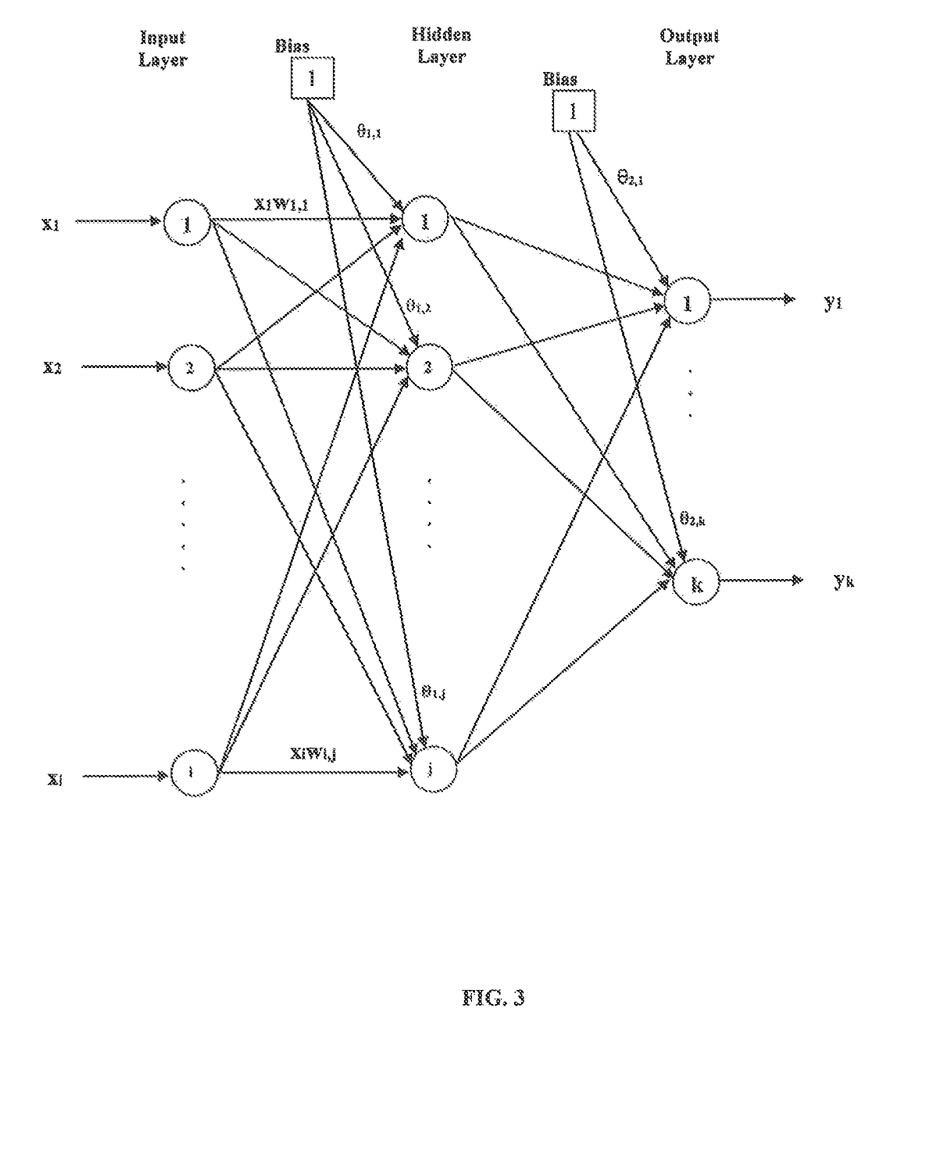
FIG. 3 illustrates a schematic of a typical multilayer perceptron model (MLP) as an alternate system and method for predicting employee attrition with two distinct outputs (with capability to provide many more outputs possible) in accordance with one preferred embodiment of present disclosure.

Another possible embodiment is illustrated in FIG. 3 that involves an Artificial Neural Network model along with a Multi-Layer Perceptron network (MIT). In an exemplary form, MLP consists of an input layer 'x' comprising of inputs for all star and non-star attrition triggers. These star and non-star attrition trigger inputs when cumulatively aggregated, sum to number of triggers, and each of these triggers 1 to i correspond to the inputs $x_1$ to $x_i$ in the MLP), and there is a hidden layer comprising of 'j' hidden nodes ($h_1$ to $h_j$) to hold the intermediate weighted sum of the inputs and train the network via error backpropagation and weight adjustment, and there is an output layer 'y' containing 'k' nodes ($y_1, y_2 \ldots, y_k$) respectively.

While this visualization and FIG. 3 are both described with only one hidden layer, an MLP containing multiple hidden layers $h_1, h_2 \ldots h_n$, etc. each containing the corresponding number of hidden nodes ($j_1, j_2 \ldots j_n$) could also be used for the same purpose, where 'n' may be assigned any arbitrary differing value per hidden layer. The output nodes $y_1$ to $y_k$, available for storing any number of interrelated outputs that the model is trained to learn comprises of two specific output nodes; however this number is by no means limiting as the number of inter-related learning outputs to be derived from the network will increase as and when more related conclusions need to be drawn depending upon the requirements of more data pertinent to attrition that needs to be available at the output layer. The outputs currently identified as required by this disclosure are $y_1$ (to hold the weighted cumulative weighted trigger score) and $y_2$ the cumulative flag—red, amber or green).

Such an MLP (with one or more hidden layers), undergoing supervised learning initially with a training set of inputs and desired outputs, learns by automatic backpropagation of error and adjustment of the weights till the weights converge to an optimal solution in predicting each of the outputs. Once the model understands the dependency between the inputs and the outputs in the training set, it is run on the test dataset (or rather, the "live" data) of all employees in the organization to predict which of them are likely to attrite.

In the case of this MLP visualization, the inputs will be all the 'm' number of star triggers (numbering $x_1$ to $x_m$) and all the 'p' non-star triggers (numbering $x_{m+1}$ to $x_i$ such that p=i−m). The weights will change to fit the model to predict the cumulative weighted trigger score and the cumulative risk flag, such that the cumulative weighted trigger score will be a function of the individual weighted trigger scores, and the cumulative flag will be a Red flag when detecting a set of {Red, Amber, Green} flags for an employee's triggers, a cumulative Amber when detecting a set of {Amber, Green} flags for an employee's triggers, or a cumulative Green when detecting only a set of {Green} flags for an employee's triggers.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation. It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

What is claimed is:

1. A method for employee attrition risk prediction and assessment, the method comprising:
   operating at least one programmed processor to carry out steps of:
   maintaining in at least one repository a data set categorizing plurality of predetermined attrition triggering parameters;
   retrieving from the data set, quantitative information indexed for at least one attrition triggering parameter of the employee;
   computing a weighted trigger score for each retrieved quantitative information, wherein a triggered numeric value colligated with employee organization association information is multiplied with a weight percentage accorded to said quantitative information to obtain the weighted trigger score, and also assigning a corresponding risk flag thereto;
   calculating a cumulative weighted trigger score by aggregating each weighted trigger score and also assigning a cumulative risk flag to the corresponding quantitative information, said cumulative risk flag deduced from each of a priori assigned risk flag for the corresponding quantitative information; and
   outputting, based at least on the calculated cumulative weighted trigger score in combination with the cumulative risk flag, a prediction on likelihood of employee attrition and automatically notifying a human resource (HR) personnel based on the calculated cumulative weighted trigger score, wherein the calculated cumulative weighted trigger score in combination with the cumulative risk flag enables the HR personnel to track high performers and highly dissatisfied performers with corresponding risk of attrition indicating one of a high risk of attrition, less likely risk of attrition or least likely risk of attrition.

2. The method of claim 1, wherein the attrition triggering parameters are selected from a group comprising "star attrition triggers parameters" or "non-star attrition triggers parameters".

3. The method of claim 2, wherein the star attrition trigger parameters and the non-star attrition trigger parameters comprise a non-exhaustive set of satisfaction and dissatisfaction factors including but not limited to current and prior annual rating combinations, employee rating disagreements, promotion status, salary variations, grievances and redressal, project allocation history, skill set, working hours, shift timings, commuting distance and time of travel, location, reward and compensation, recognition history, growth curve, previous employment history, learning initiative levels, transfer request, academic history, roles and responsibilities, designation or alignment with organization objectives.

4. The method of claim 1, wherein the data set maintained in the repository comprises an annotation in a plurality of tables indicative of employee attributes pertaining to the attrition triggering parameters along with the associated quantitative information with each employee being uniquely associated with a primary key.

5. The method of claim 1, wherein the weighted trigger score is computed for corresponding quantitative information associated with employee attrition trigger based at least in part on the triggered numeric value colligated with employee-organization association information including but not limited to employee employment history, employee grade and designation, employee performance history or any combination thereof.

6. The method of claim 1, wherein the weight percentage is optionally accorded a predetermined default value, or are allowed to be manually adjusted by a user using a user interface thereby overriding said predetermined default values assigned to the weight percentage.

7. The method of claim 1, wherein the risk flag is:
set to red representative of high risk of attrition for a quantitative information associated with the star attrition trigger;
set to amber representative of less likely risk of attrition for a quantitative information corresponding to the star attrition trigger or the non-star attrition trigger; and
set to green representative of least likely risk of attrition for a quantitative information corresponding to the non-star attrition trigger.

8. The method of claim 1, wherein the cumulative risk flag is assigned based on each of the priori assigned risk flags, and is characterized in that for a set of risk flags comprising red, amber and green flags or a selective combination thereof, the cumulative risk flag is selected in a predetermined order of precedence with red being highest in order, followed by amber and then green.

9. A system for predicting likelihood of employee attrition, comprising:
at least one system processor;
at least one repository containing a data set categorizing plurality of predetermined attrition triggering parameters;
a communication interface coupled to the system processor, capable of connecting the system processor to the repository and a plurality of input units and display units to establish a communication link; and
a memory coupled to the system processor, the memory storing a portal logic executable by the processor causes the system to perform steps of:
retrieving from the data set, quantitative information indexed for at least one attrition triggering parameter of the employee;
computing a weighted trigger score for each retrieved quantitative information, wherein a triggered numeric value colligated with employee organization association information is multiplied with a weight percentage accorded to said quantitative information to obtain the weighted trigger score, and also assigning a corresponding risk flag thereto;
calculating a cumulative weighted trigger score by aggregating each weighted trigger score and also assigning a cumulative risk flag to the corresponding quantitative information, said cumulative risk flag deduced from each of a priori assigned risk flag for the corresponding quantitative information; and
outputting on any of a plurality of display units, based on calculated cumulative weighted trigger score in combination with the cumulative risk flag, a prediction on likelihood of employee attrition and automatically notifying a human resource (HR) personnel based on the calculated cumulative weighted trigger score, wherein the calculated cumulative weighted trigger score in combination with the cumulative risk flag enables the HR personnel to track high performers and highly dissatisfied performers with corresponding risk of attrition indicating one of a high risk of attrition, less likely risk of attrition or least likely risk of attrition.

10. The system of claim 9, wherein the attrition triggering parameters are selected from a group comprising of "star attrition triggers" and "non-star attrition triggers", wherein "the star attrition triggers" and "the non-star attrition triggers" comprise a non-exhaustive set of satisfaction and dissatisfaction factors including but not limited to current and prior annual rating combinations, employee rating disagreements, promotion status, salary variations, grievances and redressal, project allocation history, skill set, working hours, shift timings, commuting distance and time of travel, location, reward and compensation, recognition history, growth curve, previous employment history, learning initiative levels, transfer request, academic history, roles and responsibilities, designation or alignment with organization objectives.

11. The system of claim 9, wherein repository comprises an annotation in a plurality of tables indicative of employee attributes pertaining to the attrition triggering parameters along with the associated quantitative information with each employee being uniquely associated with a primary key.

12. The system of claim 9, wherein the system computes the weighted trigger score for corresponding quantitative information associated with employee attrition trigger based at least in part on the triggered numeric value colligated with employee-organization association information including but not limited to employee employment history, employee grade and designation, employee performance history or any combination thereof.

13. The system of claim 9, wherein the system optionally accords predetermined default value to the weight percentage, or allow user to manually adjust the weight percentage using the input unit thereby overriding said predetermined default values assigned to the weight percentage.

14. The system of claim 9, wherein the system sets the risk flag to:
red representative of high risk of attrition for a quantitative information associated with the star attrition trigger;

amber representative of less likely risk of attrition for a quantitative information corresponding to the star attrition trigger or the non-star attrition trigger; and green representative of least likely risk of attrition for a quantitative information corresponding to the non-star attrition trigger.

15. The system of claim 9, wherein the cumulative risk flag is assigned based on each of the priori assigned risk flags, and is characterized in that for a set of risk flags comprising red, amber and green flags or a selective combination thereof, the cumulative risk flag is selected in a predetermined order of precedence with red being highest in order, followed by amber and then green.

\* \* \* \* \*